United States Patent Office 3,274,183
Patented Sept. 20, 1966

3,274,183
3-(17β-HYDROXY-1,4-DIMETHYLESTRA-1,3,5(10)-TRIEN - 17α - YL)PROPIONIC ACID LACTONE AND INTERMEDIATES
Leland J. Chinn, Morton Grove, Ill., assignor to G. D. Searle & Co., Chicago, Ill., a corporation of Delaware
No Drawing. Filed Nov. 23, 1964, Ser. No. 413,297
5 Claims. (Cl. 260—239.57)

This invention relates to 3-(17β-hydroxy-1,4-dimethylestra-1,3,5(10)-trien-17α-yl)propionic acid lactone, intermediates thereto, and processes for the preparation thereof. Those skilled in the art will recognize that 3-(17β-hydroxy - 1,4-dimethylestra-1,3,5(10)-trien-17α-yl)propionic acid lactone is a chemical compound of the formula

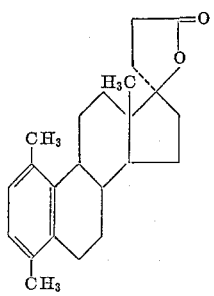

This new, useful, and unobvious product is particularly valuable because of its pharmacological properties. Thus, for example, the product inhibits both ulcer formation and pepsin activity.

Preparation of the product proceeds by ethynylating 1,4-dimethylestra-1,3,5(10)-trien-17-one [a compound described by Burgess et al. in J. Chem. Soc., 1962, 4995] in toluene solution, using acetylene in the presence of potassium tert-butoxide as the ethynylating agent. The resultant 17α-ethynyl-1,4-dimethylestra-1,3,5(10)-trien-17β-ol—or an ester thereof derived by heating with an alkanoic acid anhydride in the presence of pyridine—is carboxylated by seriatim treatment with a Grignard reagent and carbon dioxide in ethereal solution to give 3-(17β - hydroxy - 1,4-dimethylestra-1,3,5(10)-trien-17α-yl) propiolic acid. The propiolic acid, in turn, is converted to 3-(17β-hydroxy-1,4-dimethylestra-1,3,5(10)-trien-17α-yl)propionic acid lactone by low pressure hydrogenation over palladium-on-charcoal-catalyst in an ethanolic medium containing triethylamine (to insure solubility) and subsequent trituration with hydrochloric acid.

The intermediates of this invention are useful not only as means to the aforesaid lactone, but also because they, like the lactone, are characterized by valuable pharmacological properties. Thus, for example, 17α-ethynyl-1,4-dimethylestra-1,3,5(10)-trien-17β-ol is an anti-inflammatory agent adapted to reduce the edematous response to tissue insult, and as such is biologically distinct from a prior art compound (U.S. 2,947,763) structurally differing solely in the absence of the methyl susbtituent on carbon atom number 1. Moreover, 17α-ethynyl-1,4-dimethylestra-1,3,5(10)-trien-17β-ol is a progestin and an anti-algal agent, in addition to which both 17α-ethynyl-1,4-dimethylestra-1,3,5(10)-trien-17β-ol and its esters reduce plasma cholesterol levels.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

EXAMPLE 1

*17α-ethynyl-1,4-dimethylestra-1,3,5(10)-trien-17β-ol*

Acetylene is passed into a vigorously agitated solution of 150 parts of potassium tert-butoxide in 1560 parts of tert-butyl alcohol and 870 parts of toluene during 1 hour at approximately 0°. Passage of acetylene is continued while a solution of 16 parts of 1,4-dimethylestra-1,3,5-(10)-trien-17-one in 348 parts of toluene is mixed in and for 4 hours thereafter. The flow of acetylene is then shut off, but agitation is maintained for a further 12 hours during which time the reactants are permitted to warm to room temperature. The resultant mixture is diluted with approximately 1 volume of aqueous saturated ammonium chloride. The organic phase is thereupon separated, washed with water, and distilled to dryness in vacuo. The residue is chromatographed on 800 parts of silica gel, using benzene and ethyl acetate as developing solvents. From an eluate comprising 2% benzene in ethyl acetate, upon distillation of the solvent and recrystallization of the residue from a mixture of ether and pentane, there is obtained 17α-ethynyl-1,4-dimethylestra-1,3,5(10)-trien-17β-ol as colorless laths melting at approximately 174–174.5°. The product has the formula

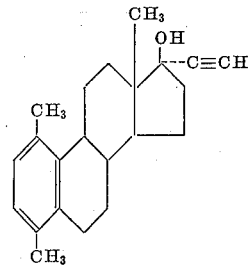

EXAMPLE 2

*17β-acetoxy-17α-ethynyl-1,4-dimethylestra-1,3,5(10)-triene*

A solution of 783 parts of 17α-ethynyl-1,4-dimethylestra-1,3,5(10)-trien-17β-ol in 5880 parts of pyridine an 8400 parts of acetic anhydride is maintained at 95° for 18 hours, whereupon it is concentrated to approximately ⅐ its original volume by vacuum distillation. The concentrate is diluted with 10 volumes of ice water, and the resultant mixture is extracted with ether. The ether extract is successively washed with aqueous 5% sodium bicarbonate and water, dried over anhydrous sodium sulfate, and stripped of solvent by vacuum distillation. The residual viscous oil is chromatographed on silica gel. Elution with benzene affords 17β-acetoxy-17α-ethynyl-1,4-dimethylestra-1,3,5(10)-triene as a colorless viscous oil which is further purified by evaporative distillation. The product boils at 180° under 0.1 mm. pressure. It has the formula

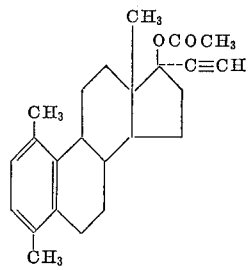

EXAMPLE 3

3-(17β-hydroxy-1,4-dimethylestra-1,3,5(10)-trien-17α-yl)propiolic acid

To a solution of 54 parts of methyl magnesium bromide in 225 parts of tetrahydrofuran is added, during 10 minutes with agitation, a solution of 24 parts of 17α-ethynyl-1,4-dimethylestra-1,3,5(10)-trien-17β-ol in 270 parts of tetrahydrofuran. The resultant mixture is heated at the boiling point under reflux with continued agitation in an atmosphere of nitrogen for 15 hours. Heating is thereupon terminated, but agitation is continued for a further 22 hours during which carbon dioxide is continually passed into the reaction mixture. Approximately 1000 parts of 10% sulfuric acid is thereupon introduced. The solid which precipitates is filtered off, washed well with water, and dried in air. The product thus isolated is 3-(17β-hydroxy-1,4-dimethylestra-1,3,5(10)-trien-17α-yl)-propiolic acid melting at 105–110°. It has the formula

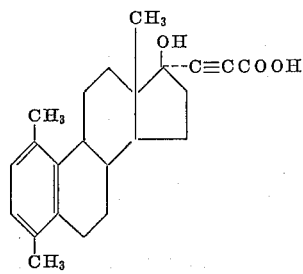

EXAMPLE 4

3-(17β-hydroxy-1,4-dimethylestra-1,3,5(10)-trien-17α-yl)propionic acid lactone A solution of 270 parts of 3-(17β-hydroxy-1,4-dimethylestra-1,3,5(10)-trien-17α-yl)propiolic acid in 83 parts of triethylamine and 32,000 parts of 95% ethanol is hydrogenated at room temperatures under 1 atmosphere of pressure in the presence of 30 parts of 5% palladium-on-charcoal. When the calculated amount of hydrogen has been absorbed, hydrogenation is stopped and the hydrogenation mixture freed of catalyst by filtration. The filtrate is distilled to dryness in vacuo. The residue, on trituration with dilute hydrochloric acid, affords colorless crystalline 3-(17β-hydroxy-1,4-dimethylestra-1,3,5(10)-trien-17α-yl)propionic acid lactone, which is collected on a filter, washed with water, dried in air, and recrystallized from aqueous methanol to give colorless plates melting at 200–202.5°. The product has the formula

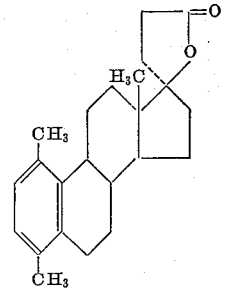

What is claimed is:
1. 3-(17β-hydroxy-1,4-dimethylestra-1,3,5(10)-trien-17α-yl)propionic acid lactone.
2. 3-(17β-hydroxy-1,4-dimethylestra-1,3,5(10)-trien-17α-yl)propiolic acid.
3. A compound of the formula

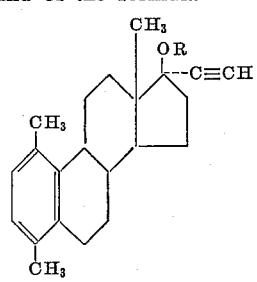

wherein R represents hydrogen or a lower alkanoyl radical.
4. 17β-acetoxy-17α-ethynyl-1,4-dimethylestra-1,3,5(10)-triene.
5. 17α-ethynyl-1,4-dimethylestra-1,3,5(10)-trien-17β-ol.

No references cited.

LEWIS GOTTS, *Primary Examiner.*

HENRY A. FRENCH, *Assistant Examiner.*